United States Patent
Lin et al.

(10) Patent No.: US 11,662,654 B2
(45) Date of Patent: May 30, 2023

(54) ILLUMINATION SYSTEM WITH SCATTERING ELEMENT AND PROJECTION DEVICE

(71) Applicant: Coretronic Corporation, Hsin-Chu (TW)

(72) Inventors: Sheng-Chiang Lin, Hsin-Chu (TW); Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/519,597

(22) Filed: Nov. 5, 2021

(65) Prior Publication Data
US 2022/0187694 A1    Jun. 16, 2022

(30) Foreign Application Priority Data
Dec. 15, 2020 (CN) .......................... 202023013425.6

(51) Int. Cl.
*G03B 21/20* (2006.01)

(52) U.S. Cl.
CPC ..... *G03B 21/2053* (2013.01); *G03B 21/2033* (2013.01); *G03B 21/2066* (2013.01)

(58) Field of Classification Search
CPC ............ G03B 21/2053; G03B 21/2033; G03B 21/2066; G03B 21/208
See application file for complete search history.

(56) References Cited

U.S. PATENT DOCUMENTS

| 2005/0180165 A1* | 8/2005 | Sado | G02B 6/002 362/606 |
| 2008/0079904 A1* | 4/2008 | Bartlett | G03B 21/005 353/31 |

FOREIGN PATENT DOCUMENTS

| CN | 106647127 A | * | 5/2017 | ............. G03B 21/20 |
| CN | 106707672 | | 5/2017 | |
| CN | 109884851 A | * | 6/2019 | ............. G03B 21/20 |
| CN | 209590519 | | 11/2019 | |

* cited by examiner

*Primary Examiner* — Magda Cruz
(74) *Attorney, Agent, or Firm* — JCIPRNET

(57) ABSTRACT

An illumination system for providing an illumination light beam is provided, which includes a light-source module, a scattering element and a light uniforming element. The light-source module emits an illumination light beam. The scattering element is between the light-source module and the light uniforming element, and has multiple scattering areas with different haze values. A haze value of a first scattering area that is close to a center of the scattering element is greater than a haze value of a second scattering area that is remote from the center. A projection device is also provided. A scattering element of the invention has multiple scattering areas with different haze values, and a haze value of one that is close to a center of the scattering element is greater than a haze value of the other that is remote from the center, thereby increasing light energy utilization.

20 Claims, 4 Drawing Sheets

ILLUMINATION SYSTEM WITH SCATTERING ELEMENT AND PROJECTION DEVICE

CROSS-REFERENCE TO RELATED APPLICATION

This application claims the priority benefit of China application serial no. 202023013425.6, filed on Dec. 15, 2020. The entirety of the above-mentioned patent application is hereby incorporated by reference herein and made a part of this specification.

BACKGROUND

Technical Field

The invention relates to an optical system and an optical device, and in particular to an illumination system and a projection device.

Description of Related Art

Generally, a laser projector includes a light-source module, a filter wheel, a light uniforming element, a light valve, and a projection lens. The filter wheel includes sections that correspond to, for example, red light, green light, and blue light. An illumination light beam emitted from the light-source module enters the light uniforming element after passing through the filter wheel and being split into red light, green light, and blue light in sequence. Light from the light uniforming element is propagated to the light valve after passing through a condenser lens, and is projected onto a screen by the projection lens.

However, light-emitting angles of the red light, green light, and blue light have an inconsistent spatial distribution, thereby affecting a color uniformity distribution of a projector. To achieve a more consistent spatial distribution of the light-emitting angles of each of the color lights, a scattering element is usually used to enlarge a field angle of each of the color lights. While the scattering element enlarges the field angle of a beam, a light-receiving angle of the light uniforming element is limited, thereby decreasing light entrance efficiency.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an illumination system and a projection device, which may improve a color uniformity distribution and may further increase light energy utilization.

The illumination system of an embodiment of the invention is configured to provide an illumination light beam. The illumination system includes a light-source module, a scattering element, and a light uniforming element. The light-source module is used to emit the illumination light beam. The scattering element is disposed between the light-source module and the light uniforming element. The scattering element has multiple scattering areas with different haze values. The scattering areas comprise a first scattering area and a second scattering area, the first scattering area is close to a center of the scattering element, and the second scattering area is apart from the center of the scattering element, a haze value of the first scattering area is greater than a haze value of the second scattering area.

The projection device of an embodiment of the invention includes an illumination system, a light valve, and a projection lens. The illumination system is used to provide an illumination light beam. The light valve is disposed on a propagation path of the illumination light beam, and is used to convert the illumination light beam into an image beam. The projection lens is disposed on a propagation path of the image beam, and is used to project the image beam from the projection device. The illumination system includes a light-source module, a scattering element, and a light uniforming element. The light-source module is used to emit the illumination light beam. The scattering element is disposed between the light-source module and the light uniforming element. The scattering element has multiple scattering areas with different haze values. The scattering areas comprise a first scattering area and a second scattering area, the first scattering area is close to a center of the scattering element, and the second scattering area is apart from the center of the scattering element, a haze value of the first scattering area is greater than a haze value of the second scattering area.

Based on the above, in an embodiment of the invention, the illumination system and the projection device are equipped with the scattering element, the scattering element has multiple scattering areas with different haze values, a haze value of a first scattering area that is close to the center of the scattering element is greater than a haze value of a second scattering area that is remote from the center of the scattering element. Therefore, the illumination system and the projection device improve the color uniformity distribution and further increase light energy utilization.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may include the situations that "A" component directly faces "B" component or one or more additional components are between "A" component and "B" component. Also, the description of "A" component "adjacent to" "B" component herein may include the situations that "A" component is directly "adjacent to" "B" component or one or more additional components are between "A" component and "B" component. Accordingly, the drawings and descriptions will be regarded as illustrative in nature and not as restrictive.

Figure 1:
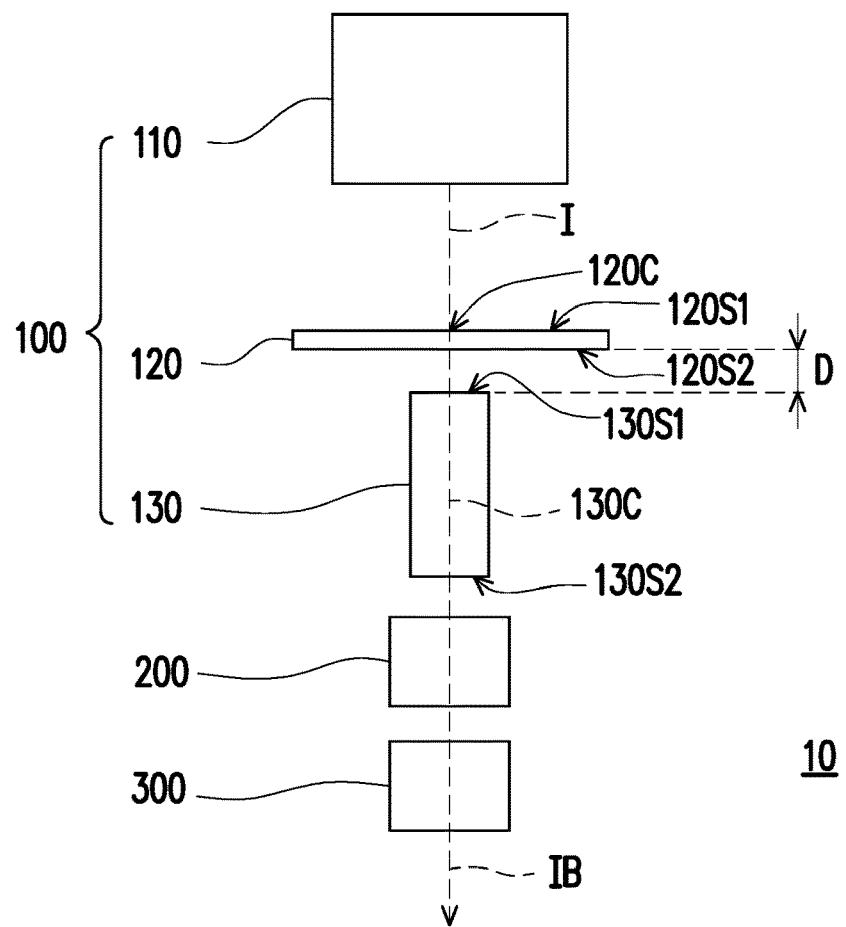
FIG. 1 is a schematic diagram of a projection device according to an embodiment of the invention.

FIG. 1 is a schematic diagram of a projection device according to an embodiment of the invention. Referring to FIG. 1, a projection device 10 of an embodiment of the invention includes an illumination system 100, a light valve 200, and a projection lens 300. The illumination system 100 is used to provide an illumination light beam I. The light valve 200 is disposed on a propagation path of the illumination light beam I, and is used to convert the illumination light beam I into an image beam IB. The projection lens 300 is disposed on a propagation path of the image beam IB, and is used to project the image beam IB from the projection device 10.

In this embodiment, the illumination system 100 includes a light-source module 110, a scattering element 120, and a light uniforming element 130. The light-source module 110 is used to emit the illumination light beam I. The light-source module 110 may include a light source such as a light-emitting diode (LED) element or a laser diode (LD), and emit various color lights of the illumination light beam I, such as red light, green light and blue light, but the invention is not limited thereto. In another embodiment, the illumination system 100 may include a wavelength conversion element and a filter element. The wavelength conversion element is, for example, a phosphor wheel, and the filter element is, for example, a color wheel. The light-source module 110 includes a LD, which emits excitation light and propagates the excitation light to the wavelength conversion element and the filter element. In a time sequence, the LD outputs the excitation light, so that the illumination system 100 emits a color light illumination light beam I the same as the excitation light. In another time sequence, the excitation light is converted into another color light different from the excitation light by the wavelength conversion element and the filter element, so that the illumination system 100 emits the another color light of the illumination light beam I.

In an embodiment, the illumination system 100 may include a light combining module, and the light-source module 110 includes a light combining module. The light combining module further includes, for example, a beam splitting element or a reflecting element, so as to guide light of different light colors to the light uniforming element 130. In an embodiment, the light combining module may include a wavelength conversion element and a filter element.

Figure 7:
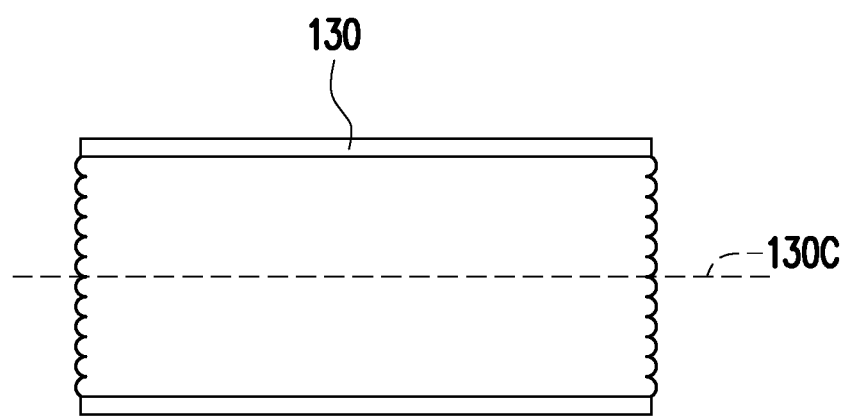
FIG. 7 is a schematic diagram of a light uniforming element.

In this embodiment, the scattering element 120 is disposed between the light-source module 110 and the light uniforming element 130. The scattering element 120 is, for example, a scattering sheet. The material of the scattering element 120 is, for example, a light scattering material, or the scattering element 120 may have a scattering microstructure. The light uniforming element 130 may be a hollow element, a solid element (such as an integration rod), or a microlens array (shown in FIG. 7), or other optical elements with a light uniformizing function, but the invention is not limited thereto.

In this embodiment, a beam field angle of the illumination light beam I is enlarged by the scattering element 120. The illumination light beam I passes through the scattering element 120 and the light uniforming element 130 in sequence, so that the illumination system 100 outputs the illumination light beam I.

Figure 2:
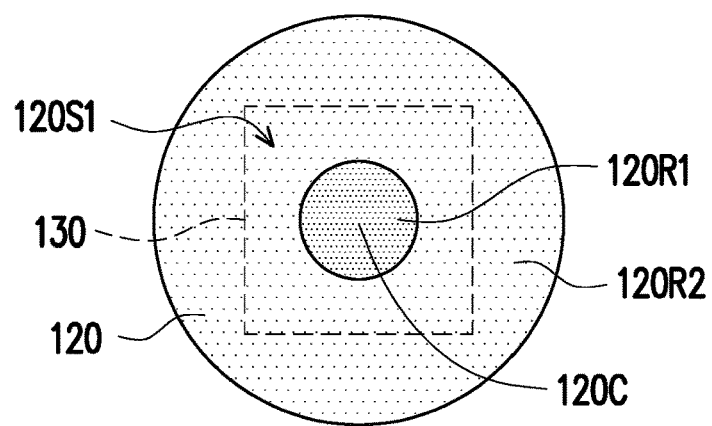
FIG. 2 is a schematic diagram of a scattering element relative to a light uniforming element.

FIG. 2 is a schematic diagram of a scattering element relative to a light uniforming element. The viewing angle of FIG. 2 is, for example, a direction from a light entrance surface 120S1 of the scattering element 120 to a light exit surface 120S2 of the scattering element 120 in FIG. 1. Referring to FIGS. 1 and 2 together, in this embodiment, the scattering element 120 has multiple scattering areas 120R1 and 120R2 with different haze values. The scattering areas 120R1 and 120R2 of the scattering element 120 are formed by a light scattering material or have a scattering microstructure, so that a haze value of each of the scattering areas 120R1 and 120R2 is greater than zero. In this embodiment, the light scattering material or the scattering microstructure may be disposed on the light entrance surface 120S1 or the light exit surface 120S2 of the scattering element 120.

In this embodiment, among any two of the scattering areas 120R1 and 120R2, a haze value of one (such as a first scattering area 120R1) that is close to a center 120C of the scattering element 120 is greater than a haze value of the other (such as a second scattering area 120R2) that is remote from the center 120C.

In this embodiment, a central axis 130C of a light entrance surface 130S1 of the light uniforming element 130 passes through one of the scattering areas 120R1 and 120R2 (such as the first scattering area 120R1) located in the center 120C of the scattering element 120.

In this embodiment, an orthographic projection of one of the scattering areas 120R1 and 120R2 (such as the first scattering area 120R1) located in the center 120C of the scattering element 120 on the light entrance surface 130S1 of the light uniforming element 130 completely overlaps at least part of the light entrance surface 130S1 of the light uniforming element 130. In other words, an area of the orthographic projection of the first scattering areas 120R1 on the light entrance surface 130S1 of the light uniforming element 130 is completely located within a surface area of the light entrance surface 130S1 of the light uniforming element 130, it also means the area of the orthographic projection of the first scattering areas 120R1 is smaller than the surface area of the light entrance surface 130S1 of the light uniforming element 130. An orthographic projection of the rest of the scattering area(s) 120R1 and 120R2 (such as the second scattering area 120R2) on the light entrance surface 130S1 of the light uniforming element 130 partially overlaps the light entrance surface 130S1 of the light uniforming element 130. In other words, an area of the orthographic projection of the second scattering areas 120R2 on the light entrance surface 130S1 of the light uniforming element 130 is partially located within the surface area of the light entrance surface 130S1 of the light uniforming element 130.

Referring to FIG. 1 again, in this embodiment, a distance D between the scattering element 120 and the light uniforming element 130 is greater than 0 millimeters and less than or equal to 2.7 millimeters. When the scattering element 120 and the light uniforming element 130 are in close proximity to each other, setting the distance D to be greater than 0 millimeters may prevent the scattering element 120 or the light uniforming element 130 from being damaged due to an adjustment during assembly. In addition, when the distance D is less than or equal to 2.7 millimeters, there may decrease the possibility that a part of the illumination light beam I is not incident on the light uniforming element 130. Therefore, the illumination system 100 or the projection device 10 of an embodiment of the invention has an increased light energy utilization.

In this embodiment, the light valve 200 is, for example, a spatial light modulator, such as a digital micro-mirror element (DMD), a liquid-crystal-on-silicon Panel (LCOS panel), or a liquid crystal panel (LCD). In addition, the projection lens 300 is, for example, a combination of one or more optical lenses with a diopter range. The one or more optical lenses include, for example, various combinations of non-planar lenses such as a double-concave lens, a double-convex lens, a concavo-convex lens, a convexo-concave lens, a plano-convex lens, and a plano-concave lens. The type of projection lens 300 is not limited in the invention.

Figure 3:
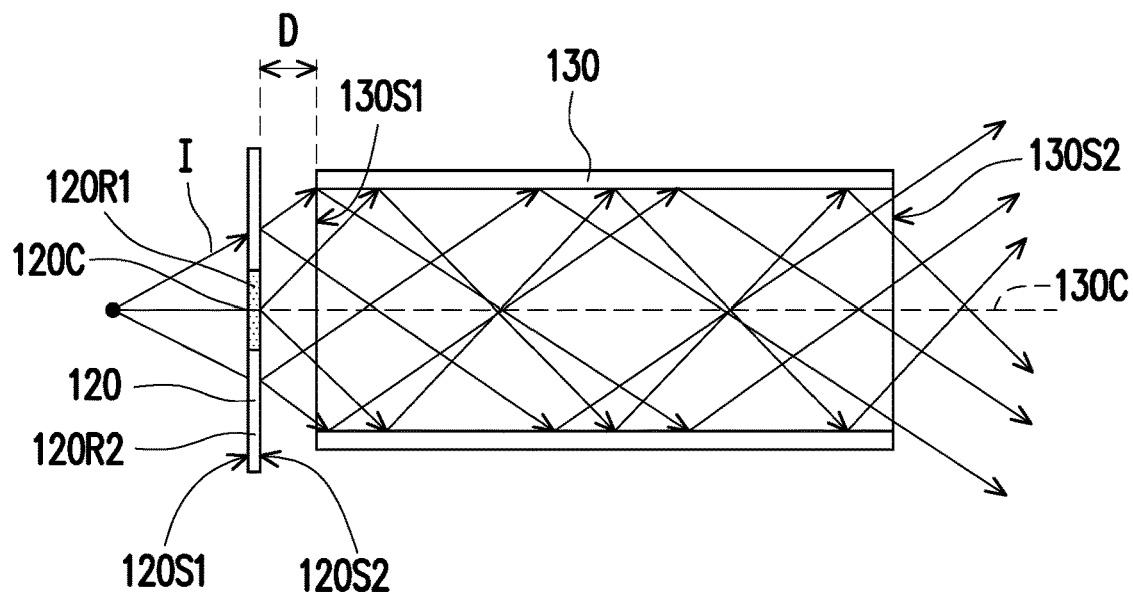
FIG. 3 is a schematic diagram of an illumination light beam passing through the scattering element and the light uniforming element in sequence.

FIG. 3 is a schematic diagram of an illumination light beam passing through the scattering element and the light uniforming element in sequence. Referring to FIG. 3, in an embodiment of the invention, since the illumination system 100 and projection device 10 are equipped with the scattering element 120, after the illumination light beam I passes through the scattering element 120, a field angle of the illumination light beam I is enlarged, thereby increasing the number of reflections of the illumination light beam I in the light uniforming element 130, resulting in an improved color uniformity of the illumination system 100 and the projection device 10. Furthermore, the scattering element 120 has the first scattering area 120R1 and the second scattering area 120R2 with different haze values. A haze value of one (such as the first scattering area 120R1) that is close to (or located in) a center 120C of the scattering element 120 is greater than a haze value of the other (such as the second scattering area 120R2) that is remote from the center 120C. Accordingly, a field angle of the illumination light beam I emitted from the first scattering area 120R1 is greater than a field angle of the illumination light beam I emitted from the second scattering area 120R2. Therefore, the illumination light beam I emitted from the second scattering area 120R2 may still be guided to the light uniforming element 130 effectively, thereby increasing the light energy utilization of the illumination system 100 and the projection device 10.

Figure 4:
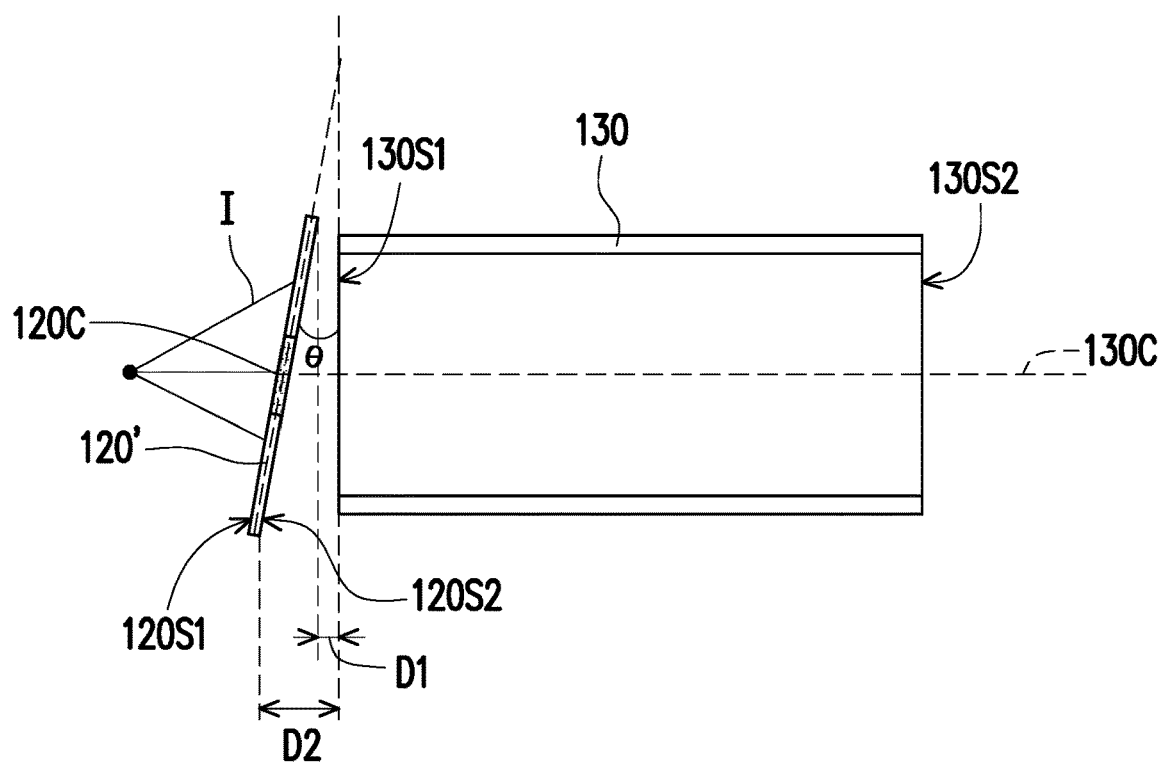
FIG. 4 is a schematic diagram of an included angle between a scattering element and a light entrance surface of a light uniforming element according to an embodiment of the invention.

FIG. 4 is a schematic diagram of an included angle between a scattering element and a light entrance surface of a light uniforming element according to an embodiment of the invention. Referring to FIG. 4, in this embodiment, an included angle θ between a scattering element 120' and a light entrance surface 130S1 of the light uniforming element 130 is greater than 0 degrees and less than 10 degrees. Since the scattering element 120' is inclined, the scattering element 120' may transform the illumination light beam I with a circular-shaped light spot and with a circular-symmetric angular distribution into the illumination light beam I with an elliptic-shaped light spot, thereby increasing the number of reflections of light in the light uniforming element 130 to improve uniformity.

In FIG. 4, a shortest distance between the scattering element 120' and the light uniforming element 130 is a distance D1, and a longest distance between the scattering element 120' and the light uniforming element 130 is a distance D2. The distance D1 may be greater than 0 millimeters, and the distance D2 may be less than or equal to 2.7 millimeters.

Figure 5:
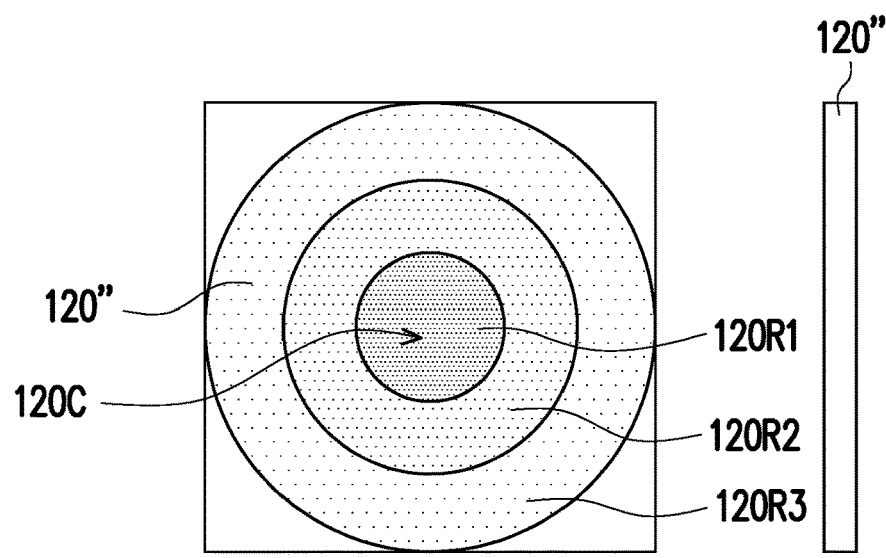
FIG. 5 is a schematic diagram of a scattering element according to another embodiment of the invention.

FIG. 5 is a schematic diagram of a scattering element according to another embodiment of the invention. The left-hand side of FIG. 5 shows a top view of a scattering element 120", and the right-hand side of FIG. 5 shows a side view of the scattering element 120". Referring to FIG. 5, the scattering element 120" in FIG. 5 is similar to the scattering element 120 in FIG. 2, and the main difference thereof is: the scattering element 120" has the first scattering area 120R1, the second scattering area 120R2 and a third scattering area 120R3. In this embodiment, the first scattering area 120R1, second scattering area 120R2, and third scattering area 120R3 are arranged in a concentric circle around the center 120C. Disposing more scattered areas further improves color uniformity and the light energy utilization of the illumination system 100 and the projection device 10. Besides, the first scattering area 120R1, the second scattering area 120R2 and a third scattering area 120R3 may have substantially the same thickness.

Figure 6:
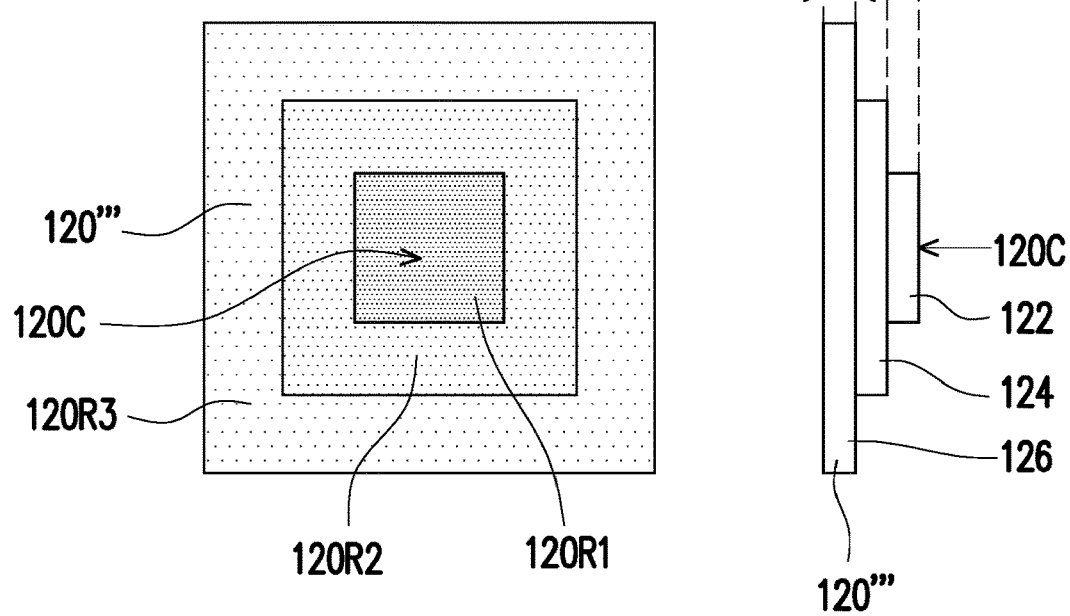
FIG. 6 is a schematic diagram of a scattering element according to yet another embodiment of the invention.

FIG. 6 is a schematic diagram of a scattering element according to yet another embodiment of the invention. The left-hand side of FIG. 6 shows a top view of a scattering element 120''', and the right-hand side of FIG. 6 shows a side view of the scattering element 120'''. Referring to FIG. 6, the scattering element 120''' in FIG. 6 is similar to the scattering element 120" in FIG. 5, and the main difference thereof is: among any three of the scattering areas 120R1, 120R2, and 120R3, a thickness of one that is close to (or located in) the center 120C of the scattering element 120''' is greater than a thickness of the other that is remote from the center 120C. For example, a thickness H1 of the first scattering area 120R1 is greater than a thickness H2 of the second scattering area 120R2, and the thickness H2 of the second scattering area 120R2 is greater than a thickness H3 of the third scattering area 120R3. The scattering element 120''' may be manufactured by stacking multiple pieces of glass with different area sizes but a same haze value. Therefore, a manufacturing process of the scattering element 120''' is relatively simple.

In summary, in an embodiment of the invention, since the illumination system and projection device are equipped with the scattering element, the illumination system and the projection device have improved color uniformity. Furthermore, the scattering element has the scattering areas with different haze values, and among any two of the scattering areas, the haze value of the one that is close to (or located in) the center of the scattering element is greater than the haze value of the other that is remote from the center of the scattering element, thereby improving the light energy utilization of the illumination system and the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An illumination system, adapted for providing an illumination light beam, wherein the illumination system comprises a light-source module, a scattering element, and a light uniforming element, wherein:
    the light-source module is adapted for emitting the illumination light beam; and
    the scattering element is disposed between the light-source module and the light uniforming element, wherein the scattering element has a plurality of scattering areas with different haze values, the scattering areas comprise a first scattering area and a second scattering area, the first scattering area is close to a center of the scattering element, the second scattering area is apart from the center of the scattering element, and a haze value of the first scattering area is greater than a haze value of the second scattering area.

2. The illumination system according to claim 1, wherein a distance between the scattering element and the light uniforming element is greater than 0 millimeters and less than or equal to 2.7 millimeters.

3. The illumination system according to claim 1, wherein a central axis of a light entrance surface of the light uniforming element passes through one of the scattering areas located in the center of the scattering element.

4. The illumination system according to claim 1, wherein an orthographic projection of one of the scattering areas located in the center of the scattering element on a light entrance surface of the light uniforming element completely located within a surface area of the light entrance surface of the light uniforming element, and an orthographic projection of the rest of the scattering areas on the light entrance surface of the light uniforming element partially located within the surface area of the light entrance surface of the light uniforming element.

5. The illumination system according to claim 1, wherein the scattering areas of the scattering element are formed by a light scattering material or have a scattering microstructure.

6. The illumination system according to claim 5, wherein the light scattering material or the scattering microstructure is disposed on a light entrance surface or a light exit surface of the scattering element.

7. The illumination system according to claim 1, wherein a thickness of the first scattering area is greater than a thickness of the second scattering area.

8. The illumination system according to claim 1, wherein the light uniforming element is a hollow element, a solid element, or a microlens array.

9. The illumination system according to claim 1, wherein an included angle between the scattering element and a light entrance surface of the light uniforming element is greater than 0 degrees and less than 10 degrees.

10. The illumination system according to claim 1, wherein a haze value of each of the scattering areas of the scattering element is greater than zero.

11. A projection device, comprising an illumination system, a light valve, and a projection lens, wherein:
    the illumination system is adapted for providing an illumination light beam;
    the light valve is disposed on a propagation path of the illumination light beam, and is adapted for converting the illumination light beam into an image beam; and
    the projection lens is disposed on a propagation path of the image beam, and is adapted for projecting the image beam from the projection device, wherein the illumination system comprises a light-source module, a scattering element, and a light uniforming element, wherein:
        the light-source module is adapted for emitting the illumination light beam; and
        the scattering element is disposed between the light-source module and the light uniforming element, wherein the scattering element has a plurality of scattering areas with different haze values, the scattering areas comprise a first scattering area and a second scattering area, the first scattering area is close to a center of the scattering element, the second scattering area is apart from the center of the scattering element, and a haze value of the first scattering area is greater than a haze value of the second scattering area.

12. The projection device according to claim 11, wherein a distance between the scattering element and the light uniforming element is greater than 0 millimeters and less than or equal to 2.7 millimeters.

13. The projection device according to claim 11, wherein a central axis of a light entrance surface of the light uniforming element passes through one of the scattering areas located in the center of the scattering element.

14. The projection device according to claim 11, wherein an orthographic projection of one of the scattering areas located in the center of the scattering element on a light entrance surface of the light uniforming element completely located within a surface area of the light entrance surface of the light uniforming element, and an orthographic projection of the rest of the scattering areas on the light entrance surface of the light uniforming element partially located within the surface area of the light entrance surface of the light uniforming element.

15. The projection device according to claim 11, wherein the scattering areas of the scattering element are formed by a light scattering material or have a scattering microstructure.

16. The projection device according to claim 15, wherein the light scattering material or the scattering microstructure is disposed on a light entrance surface or a light exit surface of the scattering element.

17. The projection device according to claim 11, wherein a thickness of the first scattering area is greater than a thickness of the second scattering area.

18. The projection device according to claim 11, wherein the light uniforming element is a hollow element, a solid element, or a microlens array.

19. The projection device according to claim 11, wherein an included angle between the scattering element and a light entrance surface of the light uniforming element is greater than 0 degrees and less than 10 degrees.

20. The projection device according to claim 11, wherein a haze value of each of the scattering areas of the scattering element is greater than zero.

\* \* \* \* \*